March 26, 1935.  P. I. HOLLMAN  1,995,351
OVEN BURNER SUPPORT
Filed Jan. 21, 1931
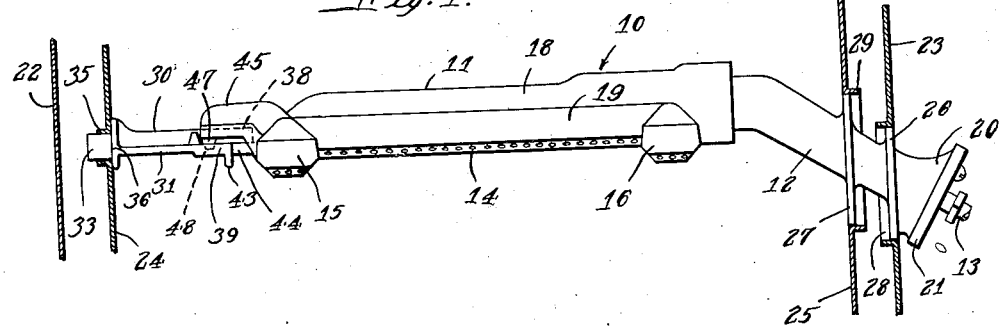
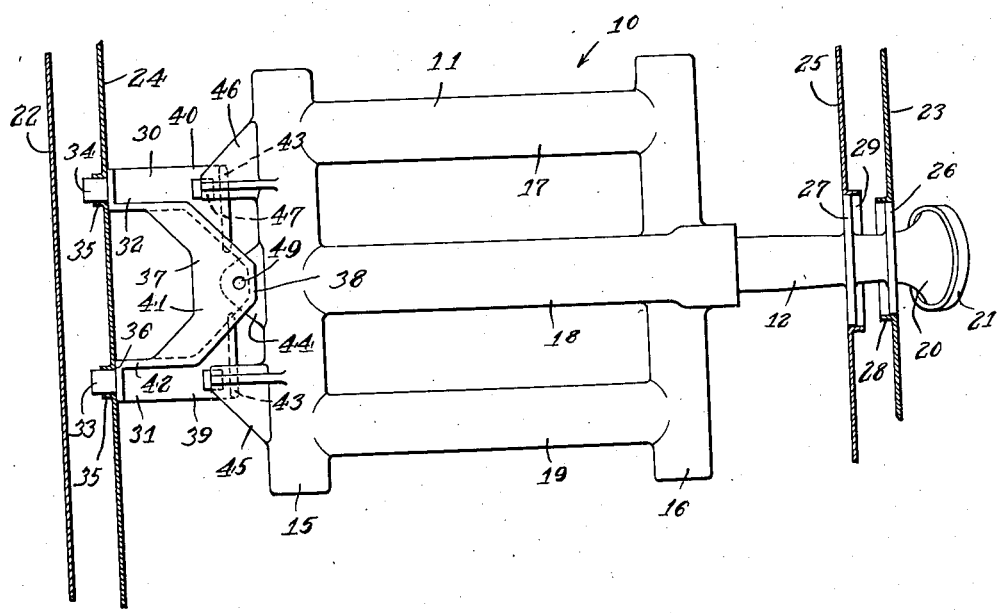
Inventor:
Peter I. Hollman
By Wilson, Dowell,
McCanna & Rehm
Attys.

Patented Mar. 26, 1935

1,995,351

UNITED STATES PATENT OFFICE 1,995,351

OVEN BURNER SUPPORT

Peter I. Hollman, Rockford, Ill., assignor to Geo. D. Roper Corporation, Rockford, Ill., a corporation of Illinois Application January 21, 1931, Serial No. 510,074

8 Claims. (Cl. 126—39)

This invention relates to an improved oven burner support for gas ranges.

Oven burners, as heretofore supported, were unhandy to install or remove, and had too much tendency to sag. Furthermore, the supports were invariably bolted to the inside of the oven, which meant extra assembling operations as well as additional material cost, and, of course, such supports did not leave the inside wall of the oven flush for neat appearance and ease in cleaning. It is, therefore, the principal object of my invention to provide a support in the form of a bracket having a pair of laterally spaced studs projecting therefrom and arranged to be simply slipped into holes provided therefor in the oven lining, thereby leaving the inside of the oven flush for neatness and ease of cleaning. The bracket is arranged to interlock with the burner with a toggle action to positively locate the burner in the proper plane, two points of support being provided by the bracket at one end of the burner and a third intermediate point by the mixing tube at the other end of the burner. The toggle interlock which the bracket has with the burner provides support in the plane of the burner instead of above and that avoids the cantilever action that occurred with other forms of supports, and there is consequently no chance for the burner to sag.

The invention will be better understood as reference is made in the following specification to the accompanying drawing in which—

Figure 1 is a fragmentary vertical section through the oven of a gas range, showing the oven burner supported in accordance with my invention, and Fig. 2 is a fragmentary horizontal section showing the burner with my improved support in plan.

The oven burner, indicated generally by the reference numeral 10, comprises a cast body portion 11 having a mixing tube 12 connected therewith at one end and extending from the oven for communication with the usual gas supply nipple 13. The burner 10 forms the subject matter of a copending application, Serial No. 510,073, filed January 21, 1931, so that it will not be necessary to go into details concerning it, other than to state, as usual, it is normally disposed in inverted position, that is, with the flame projected downwardly from the ports thereof, some of which are indicated at 14, and that it is of generally rectangular form, having transverse end conduits or headers 15 and 16 and longitudinal connecting conduits 17—19. The mixing tube 12, as described in said application, is of goose-neck form, downwardly inclined with reference to the plane of the burner and having its flared inlet end 20 provided with the usual adjustable shutter 21 for the intake of air along with the gas supplied through the nipple 13. Very little of the oven is shown in the drawing. The walls 22 and 23 are the opposite outer side walls and those at 24 and 25 are the opposed linings or inner walls of the oven. It is, of course, common practice to utilize the mixing tube for support of one end of the burner. I have shown flanges 26 and 27 suitably cast integral with the mixing tube and fitting in flanged holes 28 and 29, respectively, provided in the outer and inner walls 23 and 25 of the oven to serve the double function of closing the openings through which the mixing tube must necessarily be projected from the oven, and to provide support for the one end of the burner.

The supporting bracket 30 with which this invention is particularly concerned is arranged to provide two laterally spaced points of support, to either side of the mixing tube, for that end of the burner. In that way, the burner has three point support and is positively located in the proper plane in the oven, assuming, of course, that the bracket is itself properly located and is rigid with the burner, as will soon appear.

The bracket is suitably cast generally U-shaped as appears in Fig. 2, so as to provide the two arms 31 and 32 equally spaced to either side of the center line of the burner and the ends of these arms have reduced studs or dowel pins 33 and 34 formed thereon arranged to fit snugly in flanged holes 35 provided therefor in the oven lining 24. The shoulder 36, which is presented about the studs 33 and 34 on the arms 31 and 32, respectively, serve by engagement with the inside wall of the oven to seal the holes 35 but are primarily provided to accurately locate the bracket by abutment of these shoulders with the inside wall of the oven. The cross-portion 37 is formed so as to provide an inwardly projecting horizontal lug 38 at the middle of the cross-portion and in a horizontal plane just above corners 39 and 40 of the cross-portion which, of course, form the inner ends of the arms 31 and 32, respectively. The bracket has a web 41 cast integral therewith of which the lug 38 constitutes an extension. A vertical wall or rib 42 defines the insides of the arms 31 and 32 and is extended through the lug 38, as indicated in dotted lines, so as to provide reenforcement for the lug and avoid the possible danger of its cracking off under such strains as may be imposed thereon in the supporting of the burner. Downwardly projecting flanges are provided at 43 on the corners 39 and 40 merging at their inner ends with the wall 42, so that the corners are reenforced and are not apt to crack off under the strains imposed thereon in the supporting of the burner. Now, it will be observed that the burner has the end 15 provided with an outwardly projecting horizontal lug 44 at the middle thereof arranged for engagement under the lug 38; and a pair of laterally spaced claw-like lugs 45 and 46 evenly spaced to either side of the center line and in a plane above the lug 44 and arranged to engage on top of the corners 39 and 40, respectively, of the bracket 30. Small spurs 47 are formed on the bottom of the lugs 45 and 46 at their outer ends arranged to enter recesses 48 provided in the corners 39 and 40 of the bracket 30, so as to positively locate the burner in a predetermined relation to the bracket. Registering holes are provided in the lugs 38 and 44 of the bracket and burner, respectively, as indicated at 49, to permit entering wire or other means for fastening the parts together in the assembled relationship, as for example when the stove is being shipped from the factory.

In operation, the burner is placed in the oven and the mixing tube 12 is thrust through the holes provided in the walls 23 and 25. Then, the bracket 30 is mounted on the wall 24 by entry of its lugs 33 and 34 in the holes 35, whereupon the burner and bracket can be interlocked by raising the ends of these parts until the lugs 44—46 are in the proper relation to the lug 38 and corners 39 and 40 of the bracket to permit interlocking thereof with a toggle action, that being by lowering the ends of the parts simultaneously. When the parts reach the dead center position illustrated in the drawing the lug 38 rests on the lug 44 and the lugs 45 and 46 in turn rest on the corners 39 and 40, respectively, thereby supporting the burner and bracket in coplanar relation. It is only by simultaneously raising the adjacent ends of the burner and bracket that the burner can be disassembled from the bracket, and it is obvious that the two parts have to be raised far enough for the end of the lug 44 to move past the end of the lug 38 before the parts are detachable easily from one another. Raising of the end of the burner an inch or so is enough to bring the end of the lug 44 clear of the lug 38, and, of course, the way in which the mixing tube 12 is supported on the walls 23 and 25 and the way in which the bracket is supported on the wall 24 permit of that amount of movement of the parts. When the burner and bracket are interlocked as described, the engagement of the spurs 47 in the recesses 48 and the engagement of the shoulders 36 with the wall 24 positively insure the proper location of the burner. The fact that the studs 33 and 34 provide two points of support to either side of the center line of the burner and the mixing tube 12 provides a third point of support on the center line at the opposite end of the burner means the definite positioning of the burner in the proper horizontal plane determined by these three points of support.

It is believed the foregoing description conveys a good understanding of my invention. The following claims have been drawn with a view to covering all legitimate modifications and adaptations.

I claim:

1. In a burner support for a gas range, the combination with a burner, of a bracket for quickly detachably supporting the burner from a wall of said range, said bracket having a plurality of studs on one end thereof and the wall being provided with holes for reception of said studs whereby to provide a quickly detachable connection between the bracket and wall for support of the bracket on said wall, said bracket having portions arranged to engage the inside of said wall to locate the bracket in a predetermined position, said burner having a projecting portion on the adjacent end thereof and said bracket being constructed at its outer end for detachable engagement thereon by said projection, whereby to support the burner on the bracket, the bracket being substantially U-shaped and disposed with the bight portion adjacent the end of the burner for engagement of the burner projection thereon, and with the ends of the arms thereof projecting toward the wall, the studs being provided on said arms for entry in the holes in said wall, and the arms being arranged to engage said wall to locate the bracket in a predetermined position.

2. In a burner support for a gas range, the combination with a burner, of a bracket for quickly detachably supporting the burner from a wall of said range, said bracket having a plurality of studs on one end thereof and the wall being provided with holes for reception of said studs whereby to provide a quickly detachable connection between the bracket and wall for support of the bracket on said wall, said bracket having portions arranged to engage the inside of said wall to locate the bracket in a predetermined position, said burner having a projecting portion on the adjacent end thereof and said bracket being constructed at its outer end for detachable engagement thereon by said projection, whereby to support the burner on the bracket, the bracket being substantially U-shaped and disposed with the bight portion thereof adjacent the end of the burner and with the arms thereof projecting toward the wall, the studs being projecting toward the wall, the studs being provided on the ends of said arms for entry in the holes in said wall, and the ends of said arms serving by engagement with the wall to locate the bracket in a predetermined position, the bight portion of said bracket being conformed for interengagement with the end of the burner and the burner projection with a toggle action.

3. In a burner support for a gas range, the combination with a burner, of a bracket for quickly detachably supporting the burner from a wall of said range, said bracket having a plurality of studs on one end thereof and the wall being provided with holes for reception of said studs whereby to provide a quickly detachable connection between the bracket and wall for support of the bracket on said wall, said bracket having portions arranged to engage the inside of said wall to locate the bracket in a predetermined position, said burner having a projecting portion on the adjacent end thereof and said bracket being constructed at its outer end for detachable engagement thereon by said projection, whereby to support the burner on the bracket, the burner being provided with two other projections on the end thereof equally spaced to either side of the first projection, and said bracket being substantially U-shaped with the bight portion thereof disposed adjacent the end of the burner and with the arms reaching toward the wall, the studs being provided on the ends of said arms for entry in the holes in said wall, and the ends of said arms being arranged by engagement with said wall to locate the bracket in a predetermined position, the bight portion of said bracket being conformed to provide a middle portion for engagement on top of the middle projection of the burner, and two other portions for engagement beneath the other two projections on the burner, the said burner and bracket being arranged to be interlocked with a toggle action.

4. In a burner support for a gas range, the combination with a burner, of a bracket for quickly detachably supporting the burner from a wall of said range, said bracket having a plurality of studs on one end thereof and the wall being provided with holes for reception of said studs whereby to provide a quickly detachable connection between the bracket and wall for support of the bracket on said wall, said bracket having portions arranged to engage the inside of said wall to locate the bracket in a predetermined position, said burner having a projecting portion on the adjacent end thereof and said bracket being constructed at its outer end for detachable engagement thereon by said projection, whereby to support the burner on the bracket, the burner being provided with two other projections on the end thereof equally spaced to either side of the first projection, and said bracket being substantially U-shaped with the bight portion thereof disposed adjacent the end of the burner and with the arms reaching toward the wall, the studs being provided on the ends of said arms for entry in the holes in said wall, and the ends of said arms being arranged by engagement with said wall to locate the bracket in a predetermined position, the bight portion of said bracket being conformed to provide a middle portion for engagement on top of the middle projection of the burner, and two other portions for engagement beneath the other two projections on the burner, the said burner and bracket being arranged to be interlocked with a toggle action, one of said projections and the portion of the bracket adapted to cooperate therewith being conformed with a projection on the one part adapted to enter a recess provided in the other part whereby to positively locate the burner and bracket in a predetermined relationship.

5. In a burner support for a gas range, the combination with a burner, of a bracket for quickly detachably supporting the burner from a wall of said range, said bracket having a plurality of studs on one end thereof and the wall being provided with holes for reception of said studs whereby to provide a quickly detachable connection between the bracket and wall for support of the bracket on said wall, said bracket having portions arranged to engage the inside of said wall to locate the bracket in a predetermined position, said burner having a projecting portion on the adjacent end thereof and said bracket being constructed at its outer end for detachable engagement thereon by said projection, whereby to support the burner on the bracket, the burner being provided with two other projections on the end thereof equally spaced to either side of the first projection, and said bracket being substantially U-shaped with the bight portion thereof disposed adjacent the end of the burner and with the arms reaching toward the wall, the studs being provided on the ends of said arms for entry in the holes in said wall, and the ends of said arms being arranged by engagement with said wall to locate the bracket in a predetermined position, the bight portion of said bracket being conformed to provide a middle portion for engagement on top of the middle projections of the burner, and two other portions for engagement beneath the other two projections on the burner, the said burner and bracket being arranged to be interlocked with a toggle action, one of said projections and the portion of the bracket arranged to cooperate therewith being provided with holes arranged to register with one another when the burner and bracket are in operative relationship, whereby to permit entering means through said parts to fasten them in operative relationship.

6. In a burner support for a gas range, the combination with a burner, of a bracket for quickly detachably supporting the burner from a wall of said range, said bracket having a plurality of studs on one end thereof and the wall being provided with holes for reception of said studs whereby to provide a quickly detachable connection between the bracket and wall for support of the bracket on said wall, said bracket having portions arranged to engage the inside of said wall to locate the bracket in a predetermined position, said burner having a projecting portion on the adjacent end thereof and said bracket being constructed at its outer end for detachable engagement thereon by said projection, whereby to support the burner on the bracket, the burner being provided with two other projections on the end thereof equally spaced to either side of the first projection, and said bracket being substantially U-shaped with the bight portion thereof disposed adjacent the end of the burner and with the arms reaching toward the wall, the studs being provided on the ends of said arms for entry in the holes in said wall, and the ends of said arms being arranged by engagement with said wall to locate the bracket in a predetermined position, the bight portion of said bracket being conformed to provide a middle portion for engagement on top of the middle projection of the burner, and two other portions for engagement beneath the other two projections on the burner, the said burner and bracket being arranged to be interlocked with a toggle action, the two outer projections on said burner having spurs projecting downwardly therefrom, and the bracket having recesses provided therein for reception of said spurs whereby positively to locate the burner and bracket in a predetermined operative relationship.

7. In a burner support for a gas range, the combination with a burner, of a bracket for quickly detachably supporting the burner from a wall of said range, said bracket having a plurality of studs on one end thereof and the wall being provided with holes for reception of said studs whereby to provide a quickly detachable connection between the bracket and wall for support of the bracket on said wall, said bracket having portions arranged to engage the inside of said wall to locate the bracket in a predetermined position, said burner having a projecting portion on the adjacent end thereof and said bracket being constructed at its outer end for detachable engagement thereon by said projection, whereby to support the burner on the bracket, the burner being provided with two other projections on the end thereof equally spaced to either side of the first projection, and said bracket being substantially U-shaped with the bight portion thereof disposed adjacent the end of the burner and with the arms reaching toward the wall, the studs being provided on the ends of said arms for entry in the holes in said wall, and the ends of said arms being arranged by engagement with said wall to locate the bracket in a predetermined position, the bight portion of said bracket being conformed to provide a middle portion for engagement on top of the middle projection of the burner, and two other portions for engagement beneath the other two projections on the burner, the said burner and bracket being arranged to be interlocked with a toggle action, the middle projection on the burner and the portion of the bracket arranged to cooperate therewith being provided with holes arranged to register when the bracket and burner are in operative relationship, whereby to permit entry through said parts of means for fastening the same in operative relationship.

8. In a burner support, a horizontal burner, a vertical wall on which said burner is to be supported, the wall having spaced openings provided therein, and a horizontal bracket for supporting said burner on said wall, said bracket having spaced horizontal projections on one side thereof entered in the openings in said wall by longitudinal movement of said bracket in the horizontal plane thereof, and interfitting projections on the other side of said bracket and the adjacent side of the burner arranged to be interlocked with a toggle action, said interfitting projections having, respectively, registering recesses and projections provided thereon arranged to interengage by downward movement of the interfitting ends of the burner and bracket toward horizontal dead-center relationship so as to support the burner rigidly in the same horizontal plane with the bracket and detachably lock the burner on the bracket and hold the bracket in place on the wall, said construction permitting removal of the burner from the bracket by upward movement of the interfitting ends of the burner and bracket from horizontal dead-center relationship.

PETER I. HOLLMAN.